United States Patent [19]
Webber

[11] Patent Number: 5,456,511
[45] Date of Patent: Oct. 10, 1995

[54] TRUCK BED EXTENDER

[76] Inventor: Albert F. Webber, 187 Buffum St., Buffalo, N.Y. 14210-1911

[21] Appl. No.: 285,088
[22] Filed: Aug. 3, 1994
[51] Int. Cl.$^6$ ................................................ B60P 3/40
[52] U.S. Cl. .............................................. 296/26; 296/57.1
[58] Field of Search .............................. 296/26, 50, 57.1

[56] References Cited

U.S. PATENT DOCUMENTS

| | | | |
|---|---|---|---|
| 1,467,195 | 9/1923 | Quakenbush | 296/26 |
| 2,284,419 | 5/1942 | Greig | 296/26 |
| 2,549,018 | 4/1951 | Sarlo | 296/26 |
| 2,852,303 | 9/1958 | Hopson | 296/50 X |
| 4,472,639 | 9/1984 | Bianchi | 296/57.1 X |
| 4,531,773 | 7/1985 | Smith | 296/37.6 X |
| 5,154,470 | 10/1992 | Bringman, Jr. | 296/57.1 X |

Primary Examiner—Joseph D. Pape

[57] ABSTRACT

A truck bed extender comprising a frame formed of a pair of opposed and spaced frame elements with each frame element adapted to be coupled to opposite sidewalls of a bed of a truck; a generally u-shaped and elongated extender pan disposed between the frame elements and adapted to be positioned within bed of a truck; an extender tailgate hingeably secured to the extender pan, the tailgate extender positionable and securable against the extender pan in a closed orientation and positionable remote therefrom in an opened orientation; a roller mechanism associated between the extender pan and frame and further adapted to be associated with a bed of a truck for allowing extension of the extender pan from a bed of a truck; and a locking mechanism associated with the roller mechansim means for setting the extension of the extender pan from a bed of a truck.

1 Claim, 4 Drawing Sheets

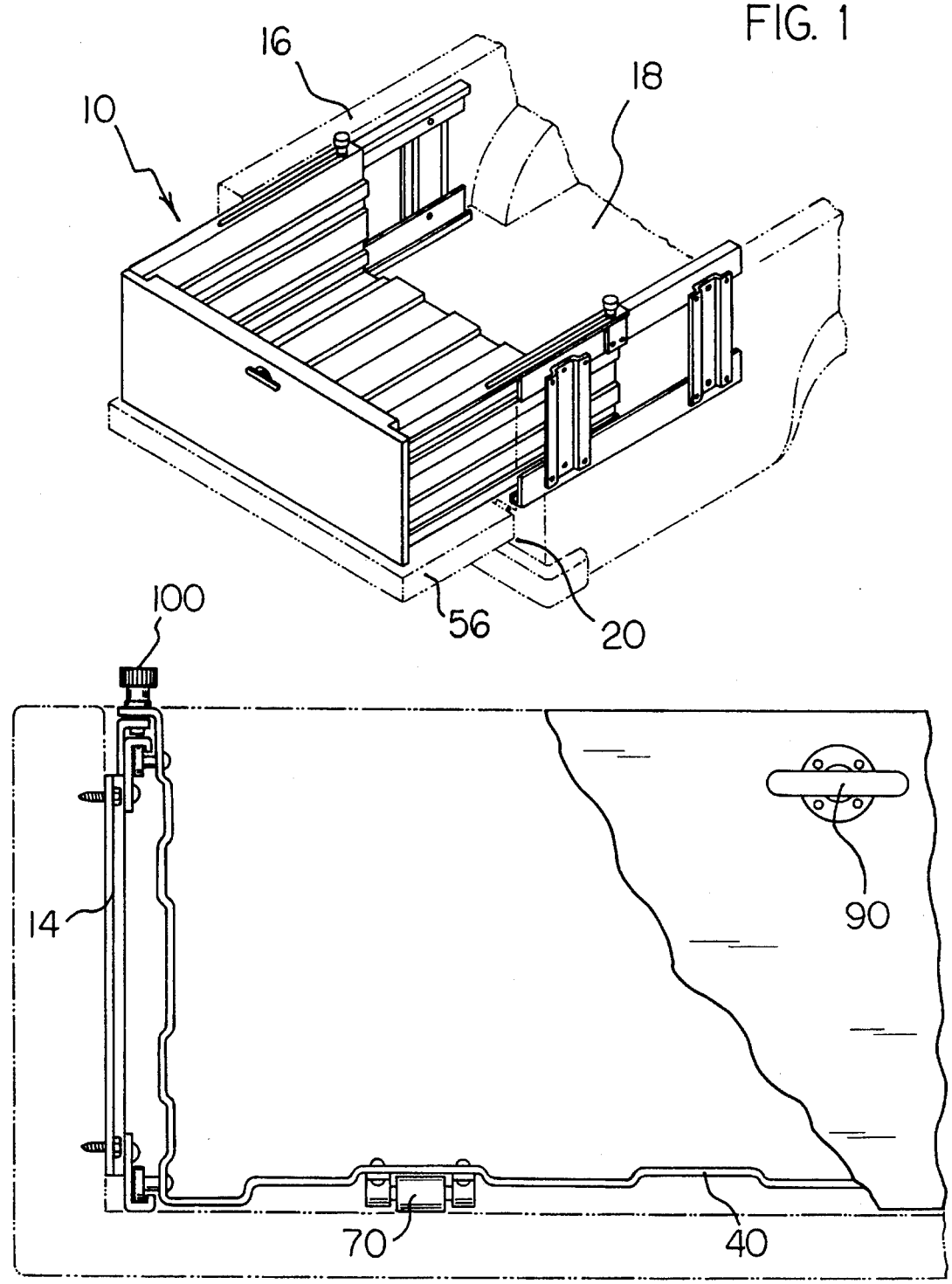

TRUCK BED EXTENDER

BACKGROUND OF THE INVENTION

1. Field of the Invention

The present invention relates to a truck bed extender and more particularly pertains to extending a bed of a truck and thereby increasing its useable cargo space with a truck bed extender.

2. Description of the Prior Art

The use of extension apparatuses is known in the prior art. More specifically, extension apparatuses heretofore devised and utilized for the purpose of extending a bed of a truck are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,114,944 to Joynt et al. telescopic tailgate extension. U.S. Pat. No. 4,472,639 to Bianchi discloses a tailgate attachments for extending the cargo space of vehicles. U.S. Pat. No. 4,531,773 to Smith discloses a vehicle tailgate extension assembly. U.S. Pat. 4,778,213 to Palmer discloses extendable vehicle tailgate assembly. U.S. Pat. No. 5,116,096 to Taylor discloses a truck cargo support outrigger.

While these devices fulfill their respective, particular objective and requirements, the aforementioned patents do not describe a truck bed extender that allows the useable cargo space provided by a bed of a pickup truck to be adjustably increased.

In this respect, the truck bed extender according to the present invention substantially departs from the conventional concepts and designs of the prior art, and in doing so provides an apparatus primarily developed for the purpose of extending a bed of a truck and thereby increasing its useable cargo space.

Therefore, it can be appreciated that there exists a continuing need for a new and improved truck bed extender which can be used for extending a bed of a truck and thereby increasing its useable cargo space. In this regard, the present invention substantially fulfills this need.

SUMMARY OF THE INVENTION

In the view of the foregoing disadvantages inherent in the known types of extension apparatuses now present in the prior art, the present invention provides an improved truck bed extender. As such, the general purpose of the present invention, which will be described subsequently in greater detail, is to provide a new and improved truck bed extender and method which has all the advantages of the prior art and none of the disadvantages.

To attain this, the present invention essentially comprises, in combination, a rigid frame formed of a pair of symmetrically opposed and spaced frame elements. Each frame element is adapted to be coupled to opposite sidewalls of a bed of a truck near its tailgate. Each frame element has a horizontal upper rail, a horizontal lower rail, and a pair of vertical corrugated cross beams coupled therebetween to define an essentially rectangular and planar configuration. The top rail and bottom rail each have a J-shaped cross-section formed with a long leg, short leg, and cross-leg and with a common integral surface therebetween defining a raceway. The upper and lower rails are each oriented such that the raceways face each other. Each frame element further includes a locking brace having a J-shaped cross-section coupled to each top rail at a location between the cross beams. A rigid extender pan is included and disposed between the frame elements of the frame and adapted to be positioned within bed of a truck. The extender pan has a generally rectangular corrugated bottom wall having a front edge, rear edge, and opposed side edges. A pair of corrugated upstanding side walls is included with each side wall extended upwards from a separate side edge and each terminated at an outwardly extended lip. Each lip further has an elongated guiding slot formed therealong. A generally rectangular extender tailgate is included and has a lower edge, upper edge, and side edges extended therebetween with the lower edge hingeably secured to the bottom wall of the extender pan at the rear edge thereof. The tailgate is positionable upright and against the extender pan in a closed orientation and positionable remote therefrom in an opened orientation. A first set of four side rollers and a second set of four side rollers are included. Each set is further formed of an upper pair of side rollers and a lower pair of side rollers. The lower pairs of side rollers of the first set and the second set are each coupled to opposite side walls of the extender pan and each are positioned in contact with a raceway of a lower rail of the adjacent frame element for longitudinal rotatable movement therein. The upper pairs of side rollers of the first and second set are each coupled to opposite side walls of the extender pan and are each positioned in contact with a raceway of an upper rail of the adjacent frame element for longitudinal rotatable movement therein. A set of four bottom rollers is included. Each bottom roller is coupled to the bottom wall of the extender pan near a separate corner and extended downwards therefrom for contact with a bed of a truck for longitudinal rotatable movement thereupon. A releasable latch means is included and coupled to the extender tailgate for releasably securing the extender tailgate in an upright orientation against the extender pan. Lastly, a pair of locking adjustment knobs is included. Each locking adjustment knob is disposed through a separate guiding slot of the extender pan and threadably coupled to a locking brace on a frame element for allowing extension of the extender pan from the bed of a truck to be set. When a tailgate of a truck is opened, the extender pan is extendable from the bed of the truck with the extender tailgate resting upon the tailgate of the truck. When the extender pan is retracted and the tailgate extender is placed in a closed orientation, the tailgate of the truck is coupleable to the truck in an upright position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck bed extender which has all the advantages of the prior art extension apparatuses and none of the disadvantages.

It is another object of the present invention to provide a new and improved truck bed extender which may be easily and efficiently manufactured and marketed.

It is a further object of the present invention to provide a new and improved truck bed extender which is of durable and reliable construction.

An even further object of the present invention is to provide a new and improved truck bed extender which is susceptible of a low cost of manufacture with regard to both materials and labor, and which accordingly is then susceptible of low prices of sale to the consuming public, thereby making such a truck bed extender economically available to the buying public.

Still yet another object of the present invention is to provide a new and improved truck bed extender which provides in the apparatuses and methods of the prior art some of the advantages thereof, while simultaneously overcoming some of the disadvantages normally associated therewith.

Even still another object of the present invention is to provide a new and improved truck bed extender for extending a bed of a truck and thereby increasing its useable cargo space.

Lastly, it is an object of the present invention to provide a new and improved truck bed extender comprising a frame formed of a pair of opposed and spaced frame elements with each frame element adapted to be coupled to opposite sidewalls of a bed of a truck; a generally u-shaped and elongated extender pan disposed between the frame elements and adapted to be positioned within bed of a truck; an extender tailgate hingeably secured to the extender pan, the tailgate extender positionable and securable against the extender pan in a closed orientation and positionable remote therefrom in an opened orientation; roller means associated between the extender pan and frame and further adapted to be associated with a bed of a truck for allowing extension of the extender pan from a bed of a truck; and locking means associated with the roller means for setting the extension of the extender pan from a bed of a truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the truck bed extender constructed in accordance with the principles of the present invention.

FIG. 2 is a side elevational view of the present invention with a portion of the extender tailgate removed for depicting the slidable coupling between the frame and extender pan and secured coupling between the frame and a bed of a truck.

The same reference numerals refer to the same parts through the various Figures.

DESCRIPTION OF THE PREFERRED EMBODIMENT

Figure 3:
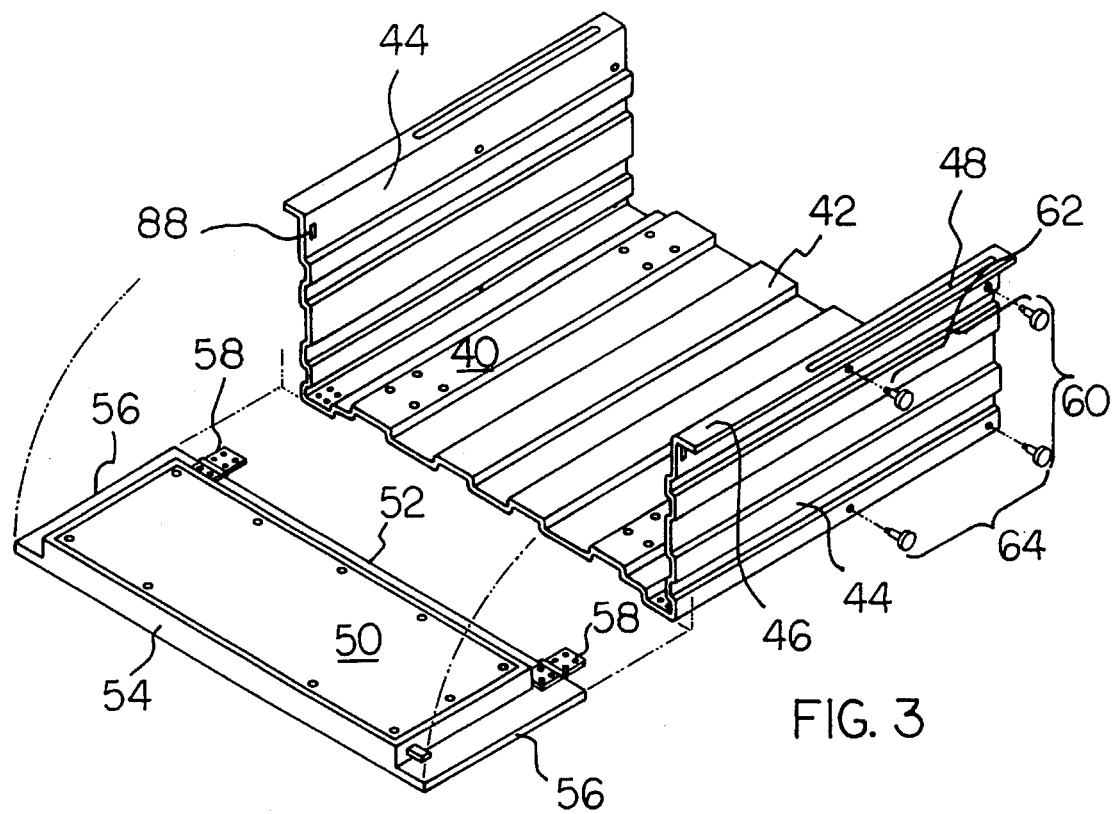
FIG. 3 is an exploded perspective view of the extender pan, side rollers, and extender tailgate.
Figure 4:
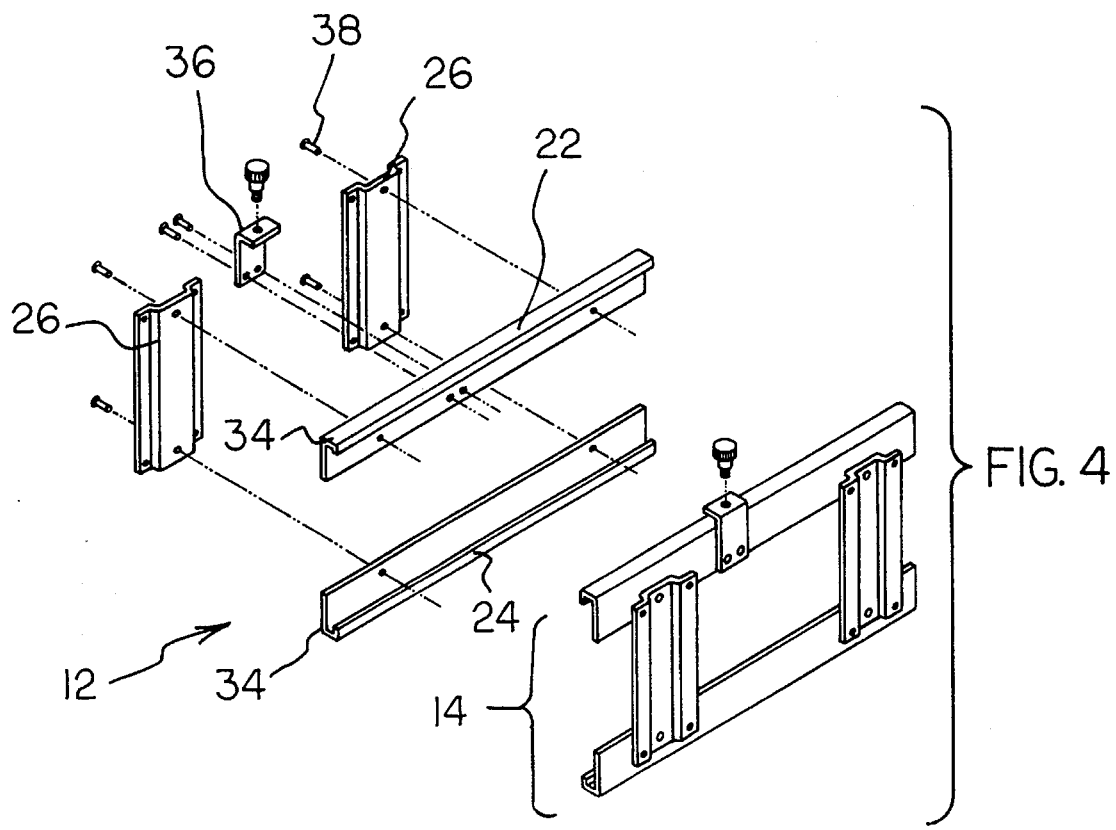
FIG. 4 is a perspective view of one frame element and exploded perspective view of the other frame element of the frame.
Figure 5:
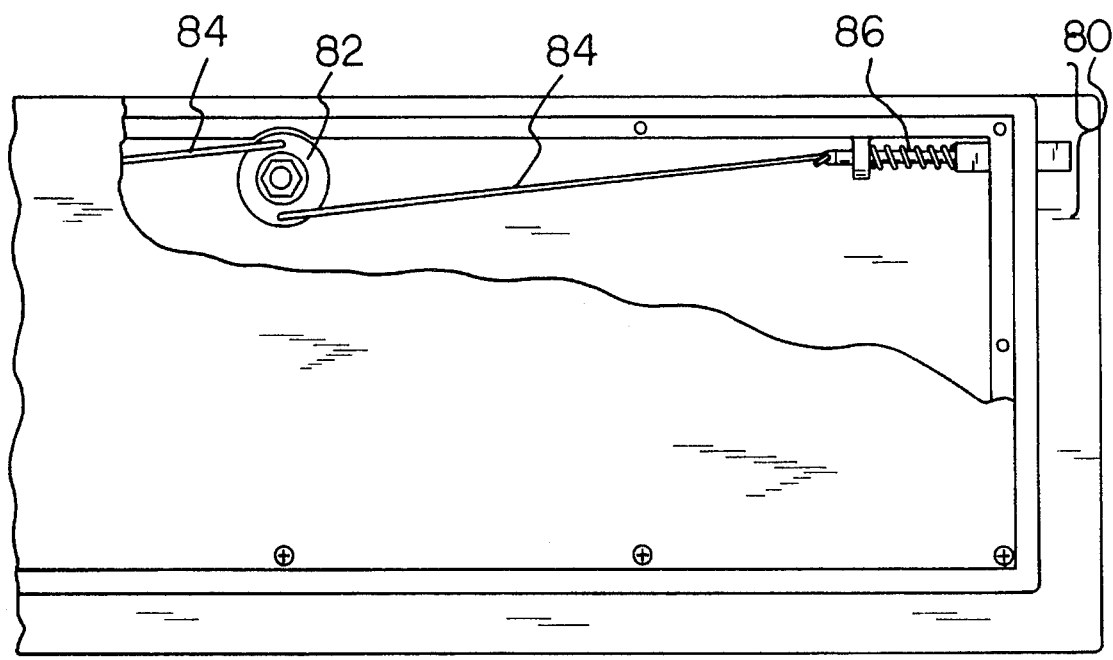
FIG. 5 is a side elevational view of the extender tailgate with a portion removed for depicting the locking means for securing the extender tailgate to the extender pan of the present invention.
Figure 6:
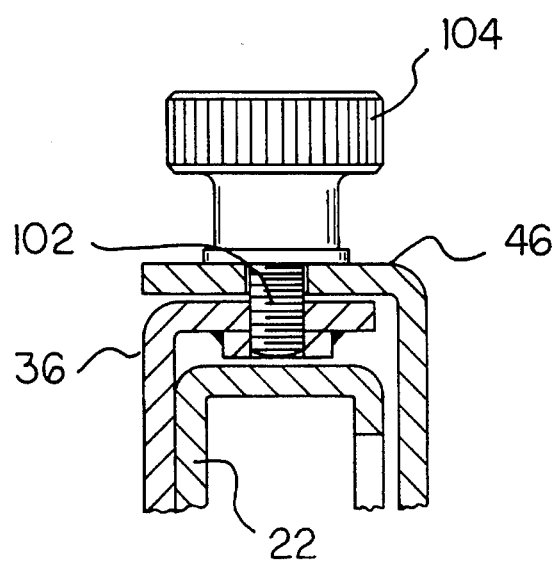
FIG. 6 is a cross-sectional view of a locking adjustment knob and its associated coupling through a slot on a lip of the extender pan and locking brace of a frame element.
Figure 7:
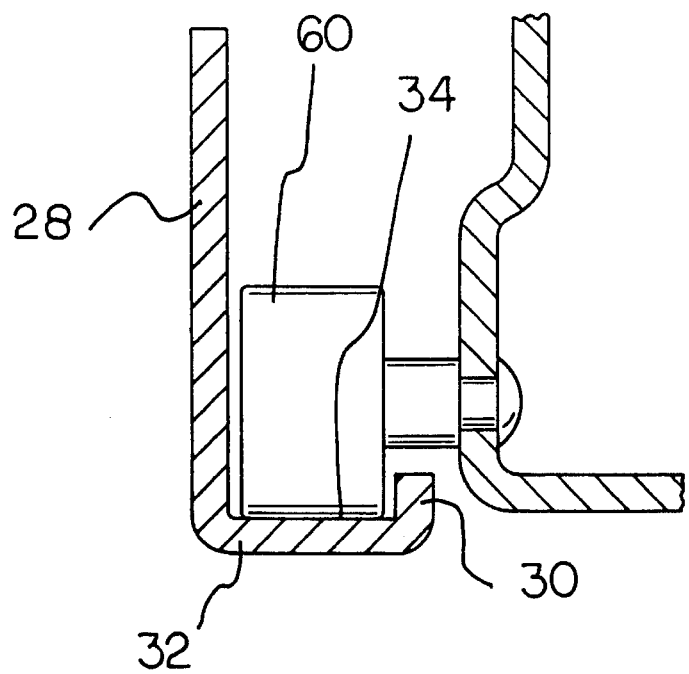
FIG. 7 is a cross-sectional view of a side roller positioned in a raceway of a frame element.
Figure 8:
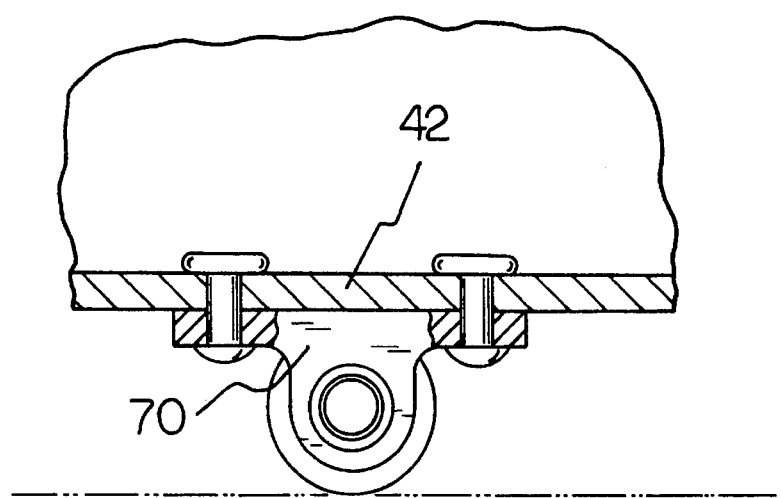
FIG. 8 is a cross-sectional view of a bottom roller and its associated rotatable contact with a bed of a truck.

With reference now to the drawings, and in particular, to FIG. 1 thereof, the preferred embodiment of the new and improved truck bed extender embodying the principles and concepts of the present invention and generally designated by the reference number 10 will be described.

Specifically, the present invention essentially includes seven major components. The major components are the frame, extender pan, extender tailgate, side rollers, bottom rollers, latch means, and locking adjustment knobs. These components are interrelated to provide the intended function.

More specifically, it will be noted in the various Figures that the first major component is the frame 12. The frame is formed of metal or other similar rigid material. The frame includes a pair of symmetrically opposed and spaced frame elements 14. Each frame element is adapted to be coupled to opposite side walls 16 of a bed 18 of a truck near its tailgate 20. Each frame element has a horizontal upper rail 22, a horizontal lower rail 24, and a pair of vertical corrugated crossbeams 26 coupled therebetween. The coupling of the upper rail, lower rail, and crossbeams defines an essentially rectangular and planar configuration for each frame element. The top rail and bottom rail each have a J-shaped cross-section formed with a long leg 28, short leg 30, and cross-leg 32. The combination of long leg, short leg, and cross-leg create a common integral surface within the rail defining a raceway 34. The raceway is adapted to receive rollers therein. The upper and lower rails are each oriented such that the raceways face each other. Each frame element further includes a locking brace 36 coupled thereto at a location between the crossbeams. Each locking element has a threaded bore disposed therethrough and a J-shaped cross-section. The coupling of the rails, cross-beams, and the locking brace are performed with a plurality of pins 38.

The second major component is the extender pan 40. The extender pan is formed of metal, plastic, or other similar rigid material. The extender pan has a generally u-shaped configuration with the open sides of this configuration aligned with the longitudinal extent of the truck bed. The extender pan has a generally rectangular and corrugated bottom wall 42. The bottom wall has a front edge, rear edge, and opposed side edges. The extender pan also includes a pair of corrugated upstanding side walls 44. Each side wall is extended upwards from a separate side edge. Each side wall is terminated at an outwardly extended lip 46. Each lip further includes an elongated guiding slot 48 formed therealong.

The third major component is the extender tailgate 50. The extender tailgate is generally rectangular in structure with a hollow interior. It is adapted to be extended across a bed 18 of a truck between its side walls 16. The extender tailgate has a lower edge 52, an upper edge 54 and side edges 56 extended therebetween. The extender tailgate also has an exterior surface and an interior surface. The lower edge of the extender tailgate is secured to the bottom wall 42 of the extender pan at the rear edge thereof with a pair of hinges 58. The extender tailgate is positionable in an upright orientation against the extender pan against the open side facing the tailgate of a truck in a closed orientation. When the extender tailgate is placed in the closed orientation and the extender pan is fully retracted into the bed of a truck, the tailgate 56 of the truck may be closed. The extender pan is also positionable remote from the extender pan in an opened orientation when the tailgate of the truck is opened.

The fourth major component is the side rollers 60. The present invention includes a first set of four side rollers and a second set of four side rollers. Each set further is formed of an upper pair 62 of side rollers and a lower pair 64 of side rollers. The lower pairs of side rollers of the first set and of the second set are each coupled to opposite side walls 44 of the extender pan and each are positioned in contact with a raceway 34 of a lower rail 24 of the adjacent frame element. Each side roller of each lower pair is positioned in this fashion for longitudinal rotatable movement within the associated raceway. The upper pairs of side rollers of the first and second set are each coupled to opposite side walls 44 of the extender pan and are each positioned in contact with a raceway 34 of an upper rail 22 of the adjacent frame element. Each side roller of each upper pair is positioned in this fashion for longitudinal rotatable movement within the associated raceway.

The fifth major component is the bottom rollers 70. The present invention includes a set of four bottom rollers. Each bottom roller is coupled to the bottom wall of the extender pan near a separate corner. Each bottom roller is extended downwards from the extender pan for contact with a bed 18 of a truck. This positioning allows longitudinal rotatable movement of the extension pan within the truck bed. Thus, the side rollers in combination with the bottom rollers and their associated coupling with the frame elements and associated contact with the truck bed allows the extender pan to be positioned back and forth in the truck bed.

The sixth major component is the latch means 80. The latch means is coupled within the extender tailgate 50 for releasably securing the extender tailgate in an upright closed orientation against the extender pan 40. The latch means is operable through a central rotatable capstan 82 connected to symmetrically opposed rods 84 extended outwards therefrom towards each side edge 56. Each rod is terminated at a spring-loaded latch 86. The spring-loaded latch is mateable within a latch slot 88 formed near each lip 46 of the extender pan. The capstan is actuateable through a handle 90 extended from the exterior surface of the extender tailgate. The handle is rotatable in one orientation for extending the spring-loaded latches for mating within the latch slots to thereby secure the extender tailgate to the extender pan. The handle is rotatable in another orientation for retracting the spring-loaded latches from the latch slots and thereby release the extender tailgate from the extender pan.

The seventh major component is the locking adjustment knobs 100. The present invention includes a pair of locking adjustment knobs. Each locking adjustment knob has a threaded tip end 102 and a knurled head 104 for allowing a user a firm grip. The threaded portion of each locking adjustment knob is disposed through a separate guiding slot 48 of the extender pan and threadably coupled to the bore of the locking brace on a frame element. The guiding slots are of sufficient length to allow movement of the extension pan relative to the locking adjustment knobs. Through association of the locking adjustment knobs and guiding slots, the extension of the extender pan from the bed of the truck may be varied. The locking adjustment knobs may be loosened for allowing the extender pan to be moved back and forth. The locking adjustment knobs may be tightened to set the extension of the extender pan from the bed of a truck. When the tailgate of a bed of a truck is opened, the extender pan is extendable from the bed of the truck such that the extender tailgate 50 rests upon the tailgate 56 of the truck. The tailgate of the truck thereby adds support for the extender pan and extender tailgate. When the extender pan is retracted fully and the extender tailgate is placed in the closed orientation, the tailgate of the truck is coupleable in an upright position. However, the tailgate of the truck need not be utilized for supporting purposes, since the frame may be formed with sufficient rigidity to support the extender pan and extender tailgate when extended. Furthermore, the present invention may be utilized with the tailgate of the truck removed. The only requirement to using the present invention is that heavy loads should be positioned well forward in a truck bed to prevent unstable loading and subsequent loss of driving control due to uneven load displacement.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A truck bed extender for extending a bed of a truck and thereby increasing its useable cargo space comprising, in combination:

a rigid frame formed of a pair of symmetrically opposed and spaced frame elements, each frame element adapted to be coupled to opposite sidewalls of a bed of a truck near its tailgate, each frame element having a horizontal upper rail, a horizontal lower rail, and a pair of vertical corrugated cross beams coupled therebetween to define an essentially rectangular and planar configuration, the top rail and bottom rail each having a J-shaped cross-section with a common integral surface defining a raceway, the upper and lower rails each oriented such that the raceways face each other, each frame element further including a locking brace having a J-shaped cross-section coupled to each top rail at a location between the cross beams;

a rigid extender pan disposed between the frame elements of the frame and adapted to be positioned within bed of a truck, the extender pan having a generally rectangular corrugated bottom wall having a front edge, rear edge, and opposed side edges extended therebetween, and a pair of corrugated upstanding side walls each extended upwards from a separate side edge and each terminated at an outwardly extended lip, each lip further having an elongated guiding slot formed therealong;

a generally rectangular extender tailgate having a lower edge, upper edge, and side edges extended therebetween with the lower edge hingeably secured to the bottom wall of the extender pan at the rear edge thereof, the tailgate extender positionable in upright and against the extender pan in a closed orientation and positionable remote therefrom in an opened orientation;

a first set of four side rollers and a second set of four side rollers, each set further formed of an upper pair of side rollers and a lower pair of side rollers, the lower pairs of side rollers of the first set and the second set each coupled to opposite side walls of the extender pan and each positioned in contact with a raceway of a lower rail of the adjacent frame element for longitudinal rotatable movement therein, the upper pairs of side rollers of the first and second set each coupled to opposite side walls of the extender pan and each positioned in contact with a raceway of an upper rail of the adjacent frame element for longitudinal rotatable movement therein;

a set of four bottom rollers, each bottom roller coupled to the bottom wall of the extender pan near a separate corner and extended downwards therefrom for contact with a bed of a truck for longitudinal rotatable movement thereupon;

releasable latch means coupled to the extender tailgate for releasably securing the extender tailgate in an upright orientation against the extender pan; and a pair of locking adjustment knobs, each locking adjustment knob disposed through a separate guiding slot of the extender pan and threadably coupled to a locking brace on a frame element for allowing extension of the extender pan from the bed of a truck to be set;

whereby when a tailgate of a truck is opened, the extender pan is extendable from the bed of a truck with the extender tailgate resting upon the tailgate, and when the extender pan is retracted and the extender tailgate is placed in a closed orientation, the tailgate of the truck is coupleable to the bed of the truck in an upright position.

* * * * *